United States Patent
Lee et al.

(10) Patent No.: US 8,619,130 B2
(45) Date of Patent: Dec. 31, 2013

(54) APPARATUS AND METHOD FOR ALTERING IMAGES FOR THREE-DIMENSIONAL DISPLAY

(75) Inventors: Joo-won Lee, Suwon-si (KR); Tae-hwan Cha, Hwaseong-si (KR); Oh-yun Kwon, Seoul (KR); Bong-geun Lee, Suwon-si (KR); Jun-hyung Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 629 days.

(21) Appl. No.: 12/861,475

(22) Filed: Aug. 23, 2010

(65) Prior Publication Data

US 2012/0026301 A1 Feb. 2, 2012

(30) Foreign Application Priority Data

Jul. 28, 2010 (KR) ........................ 10-2010-0072800

(51) Int. Cl.
*H04N 13/04* (2006.01)

(52) U.S. Cl.
USPC ................. 348/51; 348/42; 382/154; 382/285

(58) Field of Classification Search
USPC ................. 348/42–60; 353/6, 7; 352/57, 239; 715/757, 782, 848; 351/201, 240; 359/376, 378, 458, 462, 466; 342/180; 396/324; 349/15; 382/276, 285, 162, 382/173, 266, 154

See application file for complete search history.

(56) References Cited

U.S. PATENT DOCUMENTS

| 7,193,626 | B2* | 3/2007 | Otani et al. | 345/418 |
| 8,290,338 | B2* | 10/2012 | Sasaki et al. | 386/241 |
| 8,300,086 | B2* | 10/2012 | Pockett et al. | 348/42 |
| 2011/0018968 | A1* | 1/2011 | Shikata et al. | 348/47 |

* cited by examiner

*Primary Examiner* — Sath V Perungavoor
*Assistant Examiner* — Nathnael Aynalem
(74) *Attorney, Agent, or Firm* — Sughrue Mion, PLLC (57) ABSTRACT

Provided are a display device and method for altering images, the apparatus including: an input unit operable to receive a left image and a right image; and an image altering unit which is operable to alter the received left image and the received right image and to output an output image signal including the altered left image and the altered right image, wherein the left image is altered by changing a first portion, which is near a boundary area in the left image, and wherein the right image is altered by changing a second portion, which is near a boundary area in the right image.

18 Claims, 8 Drawing Sheets

APPARATUS AND METHOD FOR ALTERING IMAGES FOR THREE-DIMENSIONAL DISPLAY

CROSS-REFERENCE TO RELATED APPLICATION

This application claims priority from Korean Patent Application No. 10-2010-0072800, filed on Jul. 28, 2010 in the Korean Intellectual Property Office, the disclosure of which is incorporated herein by reference.

BACKGROUND OF THE INVENTION

1. Field of the Invention

Apparatuses and methods consistent with the present invention relate to three-dimensional (3D) imaging, and more particularly to an apparatus and method thereof for altering two-dimensional (2D) images for 3D display.

2. Description of the Related Art 3D imaging may involve creating a 3D illusion from a pair of 2D images. One of the easiest ways to enhance human depth perception is to provide the eyes of the viewer with two different images, i.e., two perspectives of the same object, which differ by an amount equal to the perspectives that both eyes might naturally receive in binocular vision.

For example, an alternate-frame sequencing system might employ two cameras to capture left and right images. The captured left and right images can then be displayed to a viewer wearing shutter glasses which respectively open and close the left and right eyes in rapid succession. The viewer's brain may then perceive depth based on slight differences between the viewed left and right images. As a result, the viewer can perceive a 3D scene based a left 2D image and a right 2D image.

Figure 1:
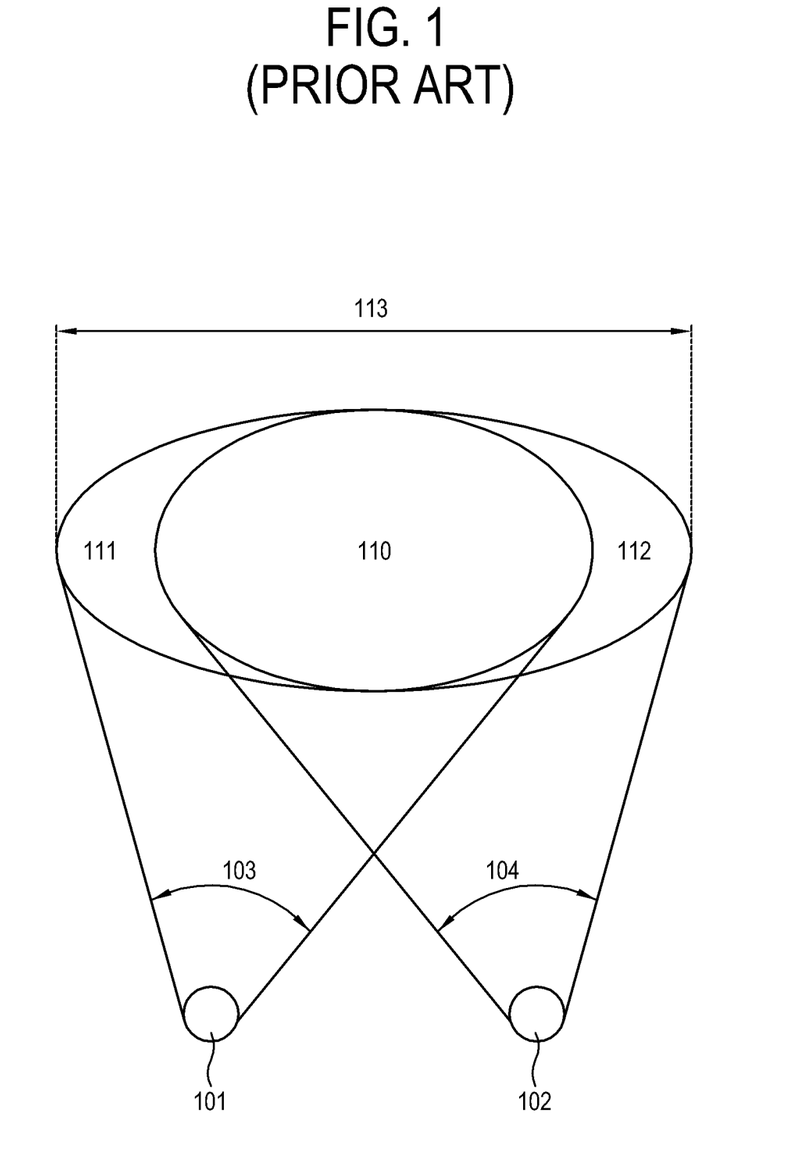
FIG. 1 illustrates an example of a binocular vision system.

FIG. 1 illustrates an example of how a pair of human eyes may perceive a scene/object. As shown in FIG. 1, a pair of eyes 101 and 102 (e.g., eyes) have vision ranges 103 and 104, respectively. The viewer in this example views a scene 113 which includes the areas 110, 111 and 112. As a result of the limited vision range of each individual eye, each eye perceives a different image of the scene 113. Here, the left eye 101 perceives areas 110 and 111. However, the right eye 102 perceives areas 110 and 112. That is, the left eye 101 cannot perceive area 112 since its range is limited to the vision range 103. Likewise, the right eye 102 cannot perceive area 111 since its range is limited to the vision range 104. Nevertheless, the viewer in this example is able to perceive depth within the scene 113 in the area 110, which is the area of the scene 113 where vision ranges 103 and 104 overlap. This occurs, as noted above, due to the slight differences perceived between the left and right images, as viewed by the viewer.

However, also may be some major differences between left and right images. Referring again to FIG. 1, the left image input unit 101 cannot perceive area 112, and the right image input unit 102 cannot perceive area 111. Here, some elements are present in the left image, but absent from the right image (and vice versa). As shown in FIG. 1, these types of differences may occur at the respective boundaries of the left and right images. As a result of these major differences, a viewer may not be able perceive any depth at those particular areas within the displayed 3D image (e.g., areas 111 and 112 in the example of FIG. 1). Additionally, a viewer may experience the phenomenon of "crosstalk" or "ghosting" within the displayed 3D image, which may result in an uncomfortable feeling for the viewer. Consequently, it is desirable to minimize and/or eliminate these potentially negative side effects.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides an apparatus for altering images, the apparatus may include: an input unit operable to receive a left image and a right image; and an image altering unit which is operable to alter the received left image and the received right image and to output an output image signal including the altered left image and the altered right image, wherein the left image is altered by changing a first portion, which is near a boundary area in the left image, and wherein the right image is altered by changing a second portion, which is near a boundary area in the right image.

The boundary area in the left image may be near a leftmost boundary of the left image, and wherein the boundary area in the right image is near a rightmost boundary of the right image.

The image altering unit may change the first portion by changing a color of the first portion, and wherein the image altering unit may change the second portion by changing a color of the second portion.

The changing of the color of the first portion may include changing a color of pixels in the first portion to black, and wherein the changing of the color of the second portion may include changing a color of pixels in the second portion to black.

The color of the first portion may be substantially a same color as the color of the second portion.

The boundary area in the left image may be substantially similar in at least one of size and shape to the boundary area in the right image.

At least one of the boundary area in the left image and the boundary area in the right image may include a plurality of sub areas.

At least one of the boundary area in the left image and the boundary area in the right image may be defined by a user.

The apparatus may further include an image difference determining unit operable to determine differences between the left image and the right image, wherein the differences are determined based on left image elements, which are present in the left image and absent in the right image, and right image elements, which are present in the right image and absent in the left image, and wherein, based on the determined differences, the image altering unit changes the first portion and the second portion.

The apparatus may further include a display operable to display the output image signal output by the altering unit.

Another aspect of the present invention provides a method for altering images, wherein the method may include: receiving a left image and a right image; and altering the received left image by changing a first portion, which is near a boundary area in the left image; altering the received right image by changing a second portion, which is near a boundary area in the right image; and outputting an output image signal including the altered left image and the altered right image.

The method may further include determining differences between the left image and the right image, wherein the differences are determined based on first elements, which are present in the left image and absent in the right image, and second elements, which are present in the right image and absent in the left image, and wherein the changing of the first portion and the changing of the second portion are performed based on the determined differences.

The method may further include displaying the output image signal.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Hereinafter, exemplary embodiments of the present invention will be described with reference to accompanying drawings, wherein like numerals refer to like elements and repetitive descriptions will be avoided as necessary.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 2:
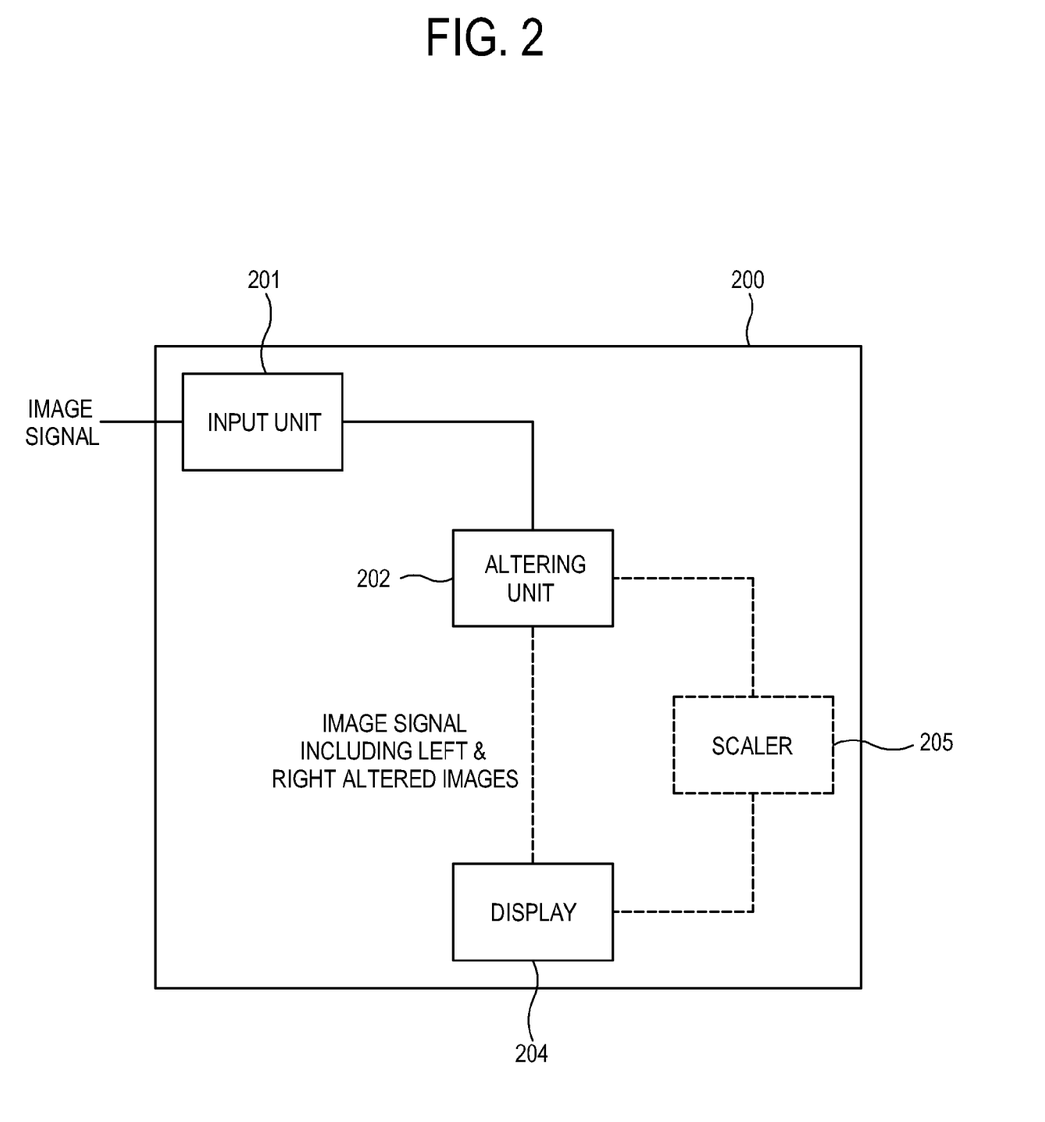
FIG. 2 illustrates an example of an apparatus according to an exemplary embodiment of the present invention.

FIG. 2 shows an apparatus according to an exemplary embodiment of the present invention. As shown in FIG. 2, an apparatus 200 includes an input unit 201, an image altering unit 202, an output unit 203 and a display 204. The display 204 is shown as being connected by a dashed line so as to indicate that the display is an optional component of the apparatus 200. The input unit 201 receives an image signal, which may include image data corresponding to a left image and image data corresponding to a right image. Alternatively, the image signal may simply be a 2D image signal including a single image, in which case the input 2D signal can be altered using a depth estimator, or a depth estimation operation (not shown), so as to provide a left image and a right image.

The altering unit 202 receives the received left and right images, alters the respective left and right images and outputs the altered left and right images. The altering unit 202 alters the respective images by changing portions of the left image which are absent in the right image, and/or changing portions of the right image which are absent in the left image. The altering unit 202 then outputs the altered images, which are then displayed by the display unit 204.

Figure 3:
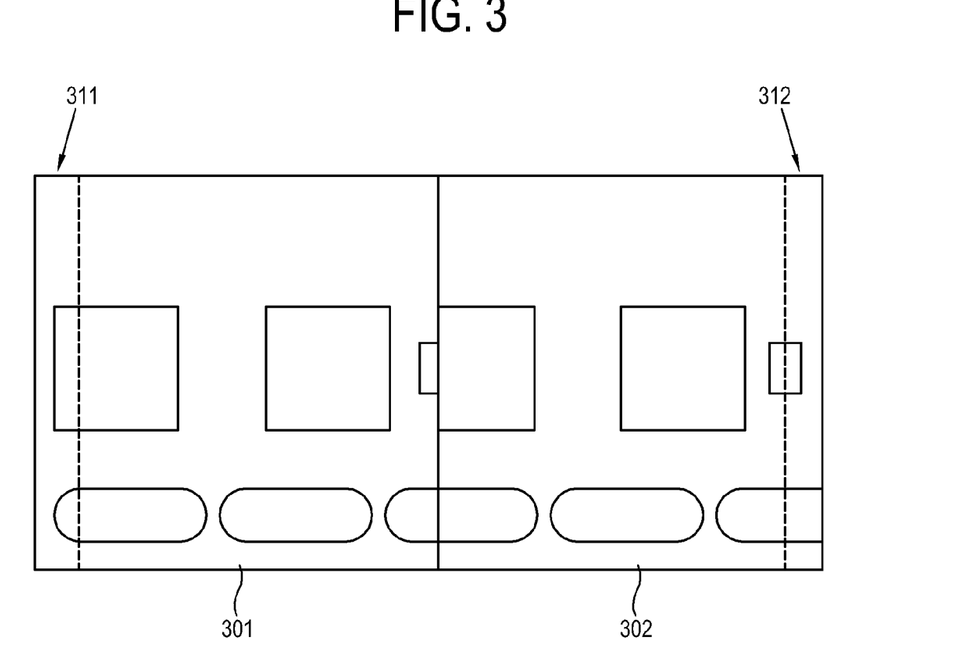
FIG. 3 illustrates left and right images according to an exemplary embodiment of the present invention.

FIG. 3 shows an example of received left and right images. As shown in FIG. 3, the area 311 (indicated by a dashed line) only appears in the left image. Likewise, the area 312 (also indicated by a dashed line) only appears in the right image. Generally, these are areas which are present in one image (e.g., left image) but not in the other (e.g., right image). For simplicity, these areas will be referred to hereinafter as "target" areas. In this example, the target areas occur near the boundaries of the respective images (i.e., near the leftmost boundary in the left image and near the rightmost boundary in the right image).

It should be noted that the target areas do not have to conform to any particular shape such as circle or ellipse. Instead, the target areas may be any polygonal shape (i.e., rectangular, square, triangle, etc.). Additionally, it should be noted that although some of the exemplary embodiments described herein show the target areas as being near a boundary of the respective images, the present invention is not limited thereto. Instead, the locations of the target areas may depend on the respective locations of the input devices (e.g., the respective positions of left and right cameras). As such, it is plausible that the target areas may be located in locations other than exclusively at the boundaries of the respective images.

As noted above, the altering unit 202 alters the target areas of the left and right images. The altering may occur in various ways. For example, the image data representing a target area may simply be removed from the image data representing the left and/or right images. Alternatively, the altering unit 202 may alter the color of the image within the target areas can be changed to a different color (e.g., black, gray, red, etc.) and/or a combination of different colors. Further, the altering unit 202 may alter the image within the target areas so as to show different patterns. For example, the image within a target area may be changed such that the target area appears as a black and white checkerboard pattern, or as an area having a color/pattern gradient, i.e., gradually fading color/pattern over the target area (e.g., from white to gray to black).

As used hereinafter, the terms "altering," "changing" and the like, as used with respect to image data and/or images, include but are not limited to removing, modifying, replacing, eliminating, adjusting, transforming, varying, etc.

Additionally, it should be noted that there are several ways by which a displayed image may be altered (with respect to a previously displayed version of the image. For example, as noted above, image data representing an image may be processed so that the image is displayed on a display screen. A display screen may include many individual pixels, and each pixel may be individually controlled so as to display a particular color. Thus, a displayed image may be altered by changing the underlying image data (e.g., from a received video stream) and/or by specifically controlling the physical components of the display screen itself (e.g., the pixels).

In other words, the effect of changing image data of an image to display a particular color (e.g., black) within a target area of the image is the same as controlling a display screen to display black color in an area which may also correspond to the target area within the image. Thus, as used herein, the terms "altering," "changing" the like, as used with respect to image data and/or images, include changing the image data so that an altered image is displayed, as well as by changing a displayed image by controlling a display screen itself.

Figure 4:
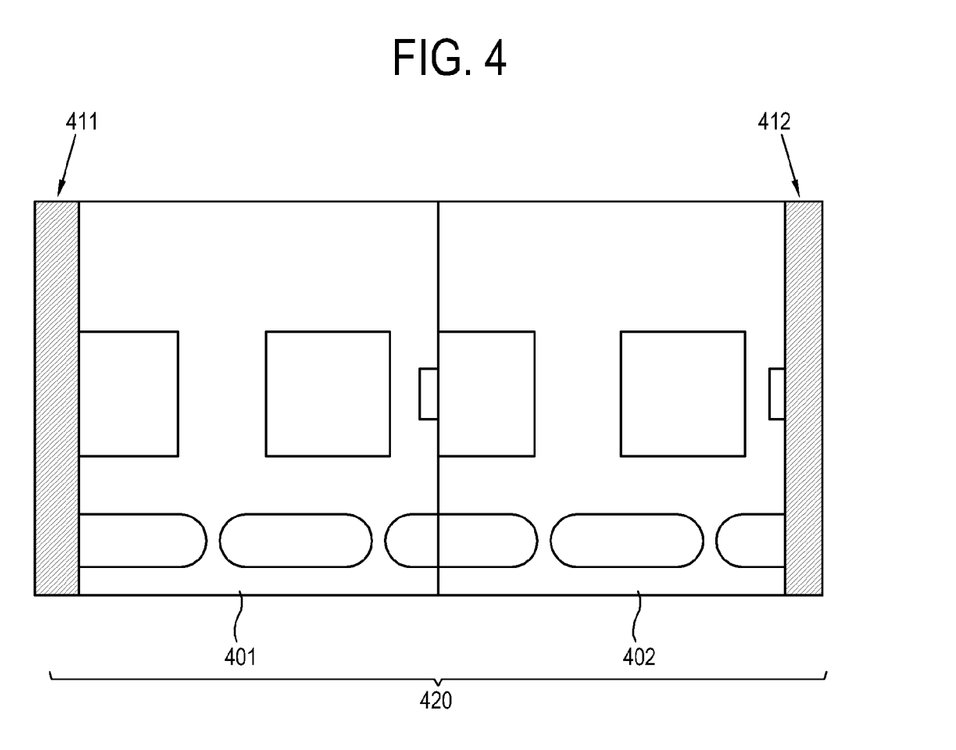
FIG. 4 illustrates left and right images according to an exemplary embodiment of the present invention.

FIG. 4 shows an example of the left and right images after being altered. As shown in FIG. 4, the color of the target area 411 of the left image 401 has been changed to black. Similarly, the color of the target area 412 of the right image 402 has also been changed to black. The result is that the altered left image 401 does not include a boundary area which is not in the altered right image 402, and vice versa.

It should be noted that while the examples of FIGS. 3 and 4 both show the left and right target areas as having similar size and shape, the present invention is not limited thereto. Instead, the left and right target areas may have different sizes and/or different shapes, orientations, etc. Further, the altering unit 202 may only alter one target area (i.e., only in the left image or only in the right image).

As noted above, the target areas do not have to be the same size and/or shape. Thus, the left target area does not have to be symmetrical with the right target area. Additionally, the target areas may be defined in various ways. For example, the size and/or shape of target areas may be predetermined. On the other hand, the target areas may be manually defined by a user, or alternatively, the target areas may be automatically determined.

As used herein the term "settings" may refer to parameters of a target area (e.g., size, shape, location, etc.), and also to the type of altering technique applied to the images target areas (e.g., coloring/shading/gradient/patterning/etc.). In other words, the term "settings," as used herein, may refer to (a) how a target area is defined, and (b) how the image within the target area is changed.

In the case of the predetermined target area, the manufacturer may determine the target area settings (e.g., size, shape, location, etc.) beforehand. The settings may then be implemented so as to alter the respective target areas within left and right images according to the predetermined settings. Again, the settings for the left target area may differ from the right target area. Moreover, the left target area may be optimized for one setting (e.g., size) and the right target area may be optimized for another setting (e.g., shape). Likewise, settings for the altering technique may also be predefined (e.g., coloring/shading/gradient/patterning/etc.).

Settings for the left and right target areas may also be manually set by a user. Further, settings for the left and right target areas may be different from each other. For example, a user might utilize a finger or a pointing device (e.g., mouse, remote control, stylus, etc.) in conjunction with an on-screen display (OSD) program or a graphical user interface (GUI) to define the size and shape of the respective target areas. In addition to the size and shape, a user might also manually set parameters (i.e., settings) related to the altering technique applied to the respective target areas, such as with regard to coloring/shading/gradient/patterning/etc.

Settings for the left and right target areas may also be set automatically. For example, the left image may be compared to the right image in order to determine which areas are present in the left image and absent from the right image (and vice versa). Thus, the target areas might be identified in the left and right images. Additionally, a depth estimation technique may be applied to the received left and right images in order determine depth within the scene depicted by the left and right images. For example, a depth map might be created for a 2D image. Whatever technique is employed, once the depth information is determined, the target areas within the left and right images can be identified.

The settings related to the altering technique applied to the images within the respective target areas (e.g., coloring/shading/gradient/patterning/etc.) can also be automated. For example, settings related to the altering technique might be automatically set based on the determination of the left and right target areas. Alternatively, the settings related to the altering technique might be automatically set independently of the determination of the left and right target areas.

It should also be noted that a combination of the above techniques may be employed to determine/define the target areas, as well as to the altering technique applied to the images within the target areas. For example: a target area may be defined by a predetermined setting, then later changed automatically, and still later manually changed by a user; or a target area may be manually defined by a user, whereas the altering technique may be based on a predetermined setting; etc.

Figure 5:
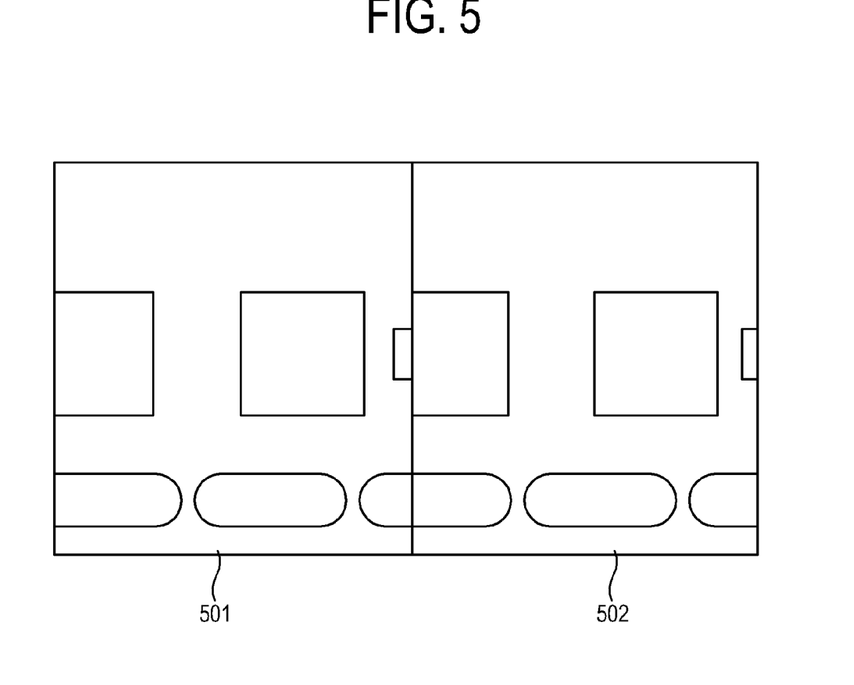
FIG. 5 illustrates left and right images according to an exemplary embodiment of the present invention.

As shown in FIG. 4, the displayed images do not fully occupy the entire displayable space 420 since the spaces 411 and 412 have been changed (in this case, colored black). In order to fill the altered spaces (411 and 412), the left and right images may be scaled to fit the total available space 420. Thus, the apparatus 200 shown in FIG. 2 may include a scaler 205 to perform a scaling operation. FIG. 5 illustrates an example of a scaled version (501, 502) of the left and right images from FIG. 4.

Figure 6:
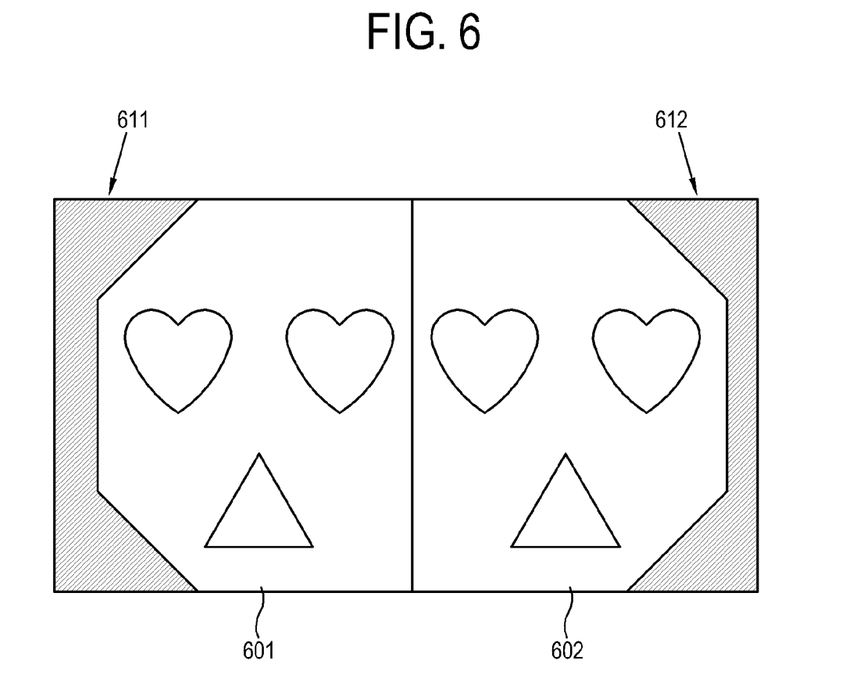
FIG. 6 illustrates left and right images according to an exemplary embodiment of the present invention.

As noted above, the target areas may be any polygonal shape. In some instances, an image may have a larger portion of target areas at the upper and/or lower parts of the image. FIG. 6 illustrates an example of where the left image 601 and right image 602 have a larger portion of target areas 611, 612 at the upper and lower parts of the respective images. As shown in FIG. 6, both the shape and size of each target area 611, 612 changes, as viewed from top to bottom, within each of the respective images 601, 602. As noted above, the settings for the respective target areas, as well as for the altering technique applied, can be determined in various ways (e.g., predetermined, manually and/or automatically).

Figure 7A:
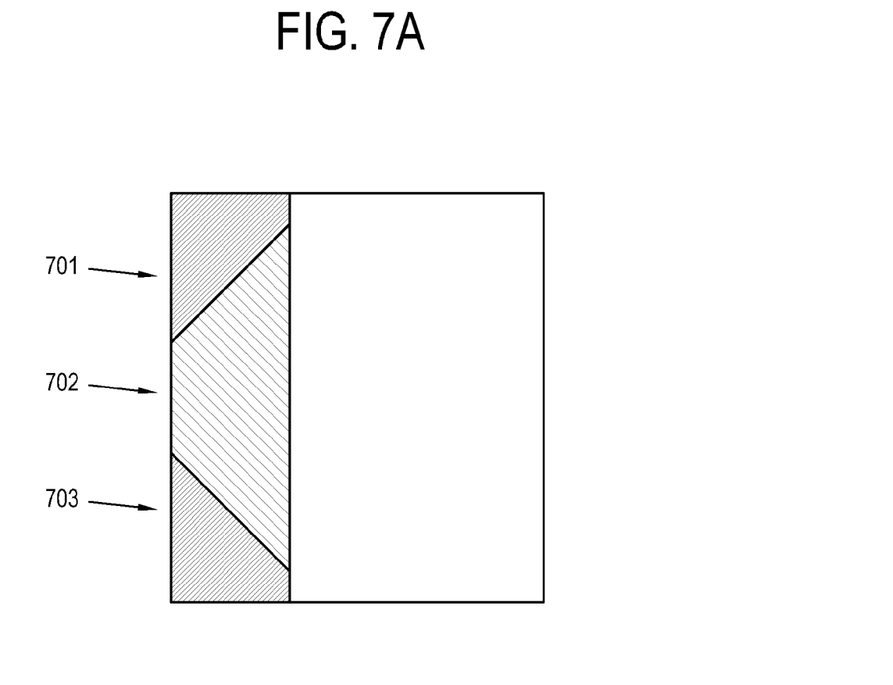
FIGS. 7A-7C illustrate examples of various altering techniques as applied to an image.
Figure 7B:
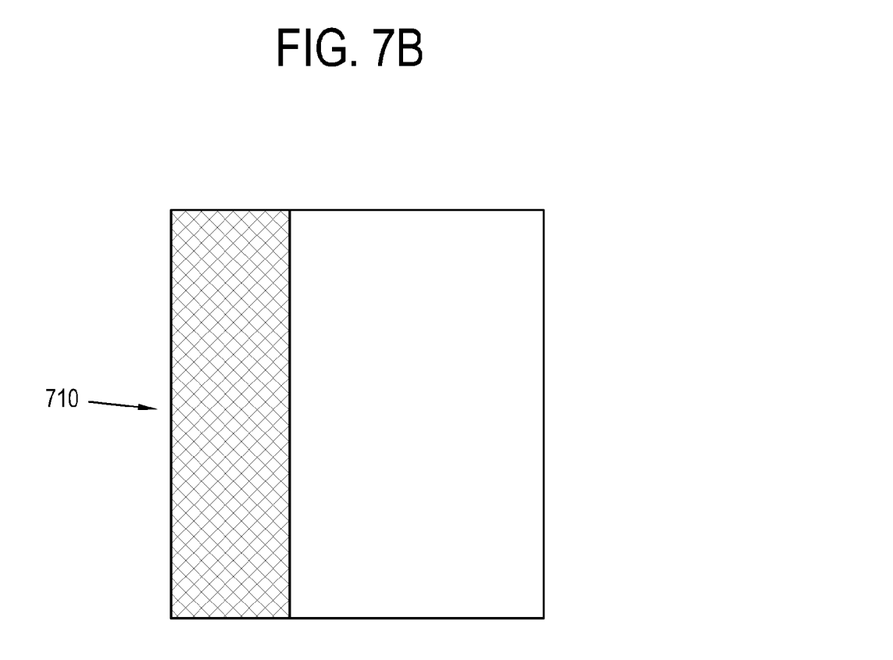
Figure 7C:
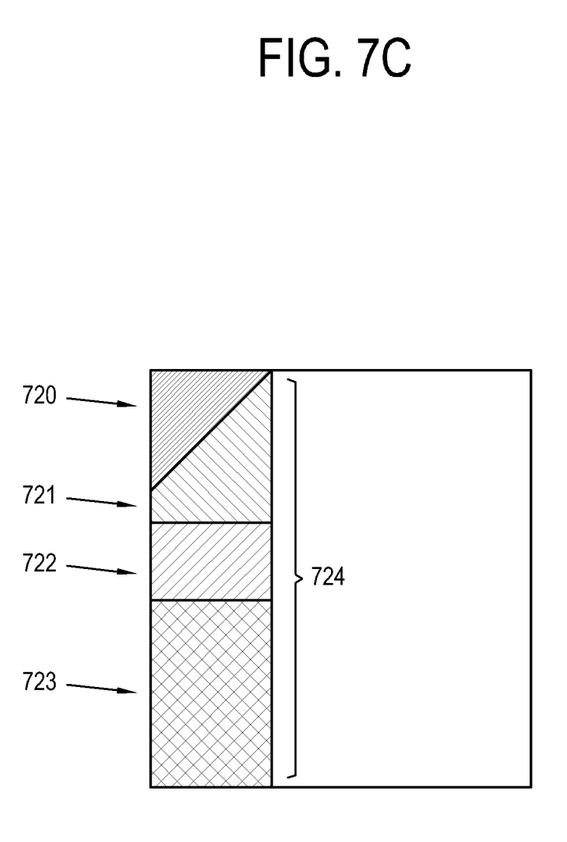

FIGS. 7A-7C illustrate examples of various altering techniques as applied to a left image. It should be noted that the examples shown in FIGS. 7A-7C are merely shown to facilitate understanding, and that the present invention is not limited thereto.

FIG. 7A shows an example where the color of the target area is changed to black in sub-areas 701 and 703, and changed to gray in sub-area 702. Thus, in this example, the target area can be sub-divided into sub-areas, and a different color can be applied to each sub-area. It should be noted that although sub-area 701 and 703 are both black in the example of FIG. 7A, sub-area 701 and 703 may be different colors, such that all three areas are colored differently from each other.

FIG. 7B shows an example where the target area is altered by replacing the image within the target area with a pattern—in this case, a crisscross pattern. Although, the pattern shown in FIG. 7B is a crisscross-type pattern, the present invention is not limited thereto. For example, the pattern might be a polka dot-type pattern, or a diamond-type pattern, etc. As with the example of FIG. 7A, the present invention might also utilize a plurality of sub-areas instead of the single target area shown in FIG. 7B.

FIG. 7C shows an example which has four different sub-areas 720, 721, 722 and 723 within an overall target area 724. Here, the image is altered such that three different colors are respectively applied to sub-areas 720, 721 and 722; and the image is further altered such that a crisscross pattern is applied to sub-area 723. It should also be noted that each of the sub-areas 721-723 has a different shape and size (sub-areas 720 and 721 both have a triangular shape, but are oriented in different ways). Again, the image altering applied in FIG. 7C is merely exemplary, and the present invention is not limited thereto.

Figure 8:
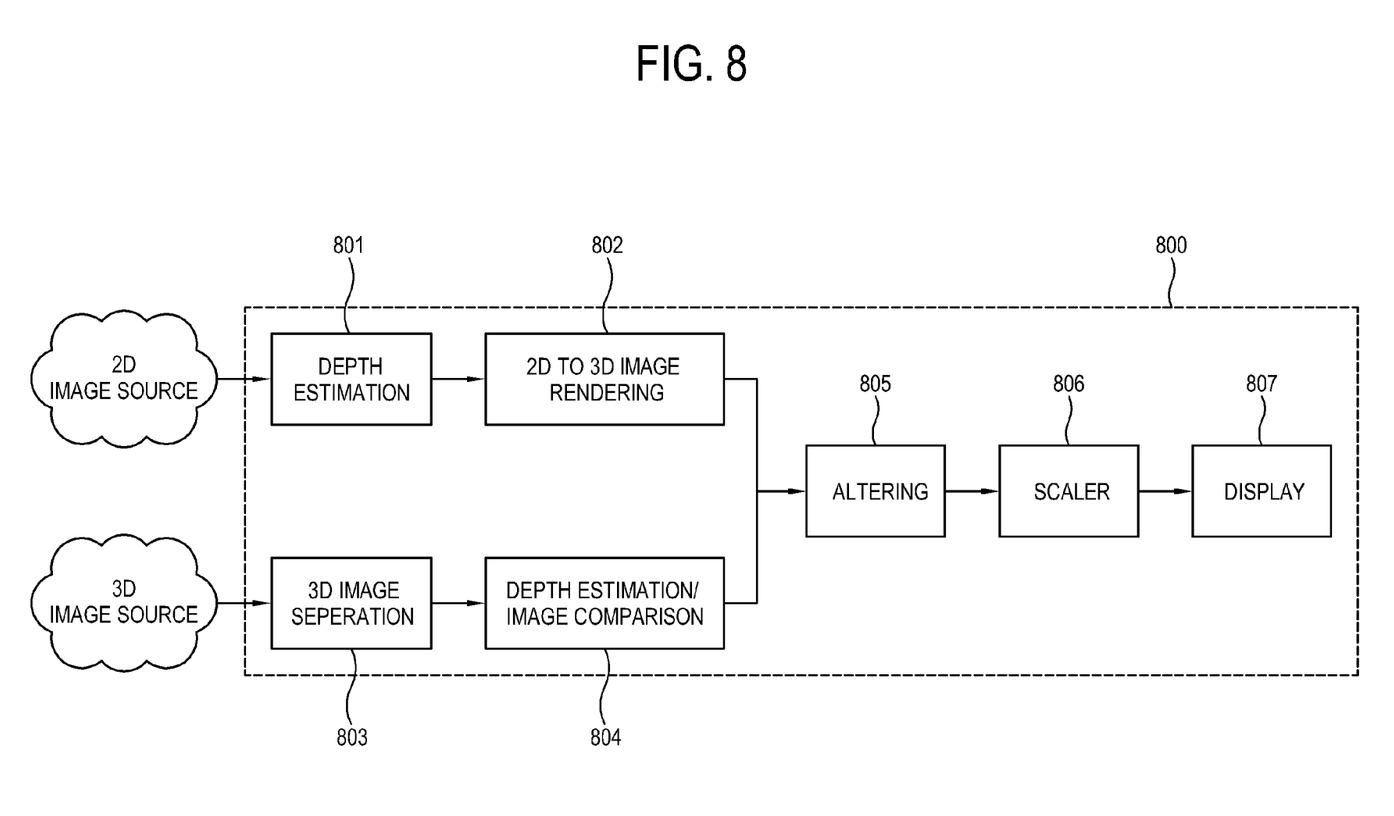
FIG. 8 illustrates an apparatus according to an exemplary embodiment of the present invention.

As noted above with respect to the apparatus 200 shown in FIG. 2, the input unit 201 may receive an image signal having image data corresponding to a left image, and image data corresponding to a right image. Additionally, the image signal may simply be a 2D image signal including a single image, in which case the input 2D signal can be altered via a depth estimation operation, so as to provide a left image and a right image. FIG. 8 illustrates an example of a system and/or apparatus 800 which can receive both types of input image signals.

As shown in FIG. 8, an exemplary embodiment of the present invention may include an apparatus 800 which is capable of receiving a 2D image from a 2D image source, and/or a 3D image from a 3D image source. Note that the present invention is not limited to the apparatus 800 shown in FIG. 8. Instead, an apparatus according to an exemplary embodiment of the present invention may only receive a 2D image; alternatively, an apparatus according to an exemplary embodiment of the present invention may only receive a 3D image; or an apparatus according to an exemplary embodiment of the present invention may receive both a 2D image or a 3D image, such as shown in FIG. 8.

If the 2D image is received, the received 2D image may be input to a depth estimation unit 801, which can use various depth estimation techniques to estimate depth within the received 2D image. Once the depth within the received 2D image is estimated, a 3D image (i.e., a left and a right image) can be rendered by the 2D-to-3D rendering unit 802. Alternatively, if a 3D image is received, the received 3D image may be input to a 3D image separation unit 803, which effectively separates the left and right images from the received 3D image. The left and right images can then be subjected to a depth estimation and/or image comparison technique which will effectively determine the location of the target areas within the left and right images. Once the targets areas have been determined, the left and right images are altered by the altering unit 805. As noted above, the altered left and right images can then be scaled by a scaler 806. Finally, the scaled/altered left and right images can be displayed on a display 807.

It should be noted that various components shown in FIG. 8 are optional (e.g., depth estimator 804, scaler 806, display 807, etc.). Additionally, while FIG. 8 is shown as being an apparatus 800, the present invention is not limited thereto. Other exemplary embodiments of the present invention may include a system, a display apparatus, an apparatus without a display, etc. Further, components may be closely connected such as in a self-contained apparatus, or distributed over a network, for example.

Figure 9:
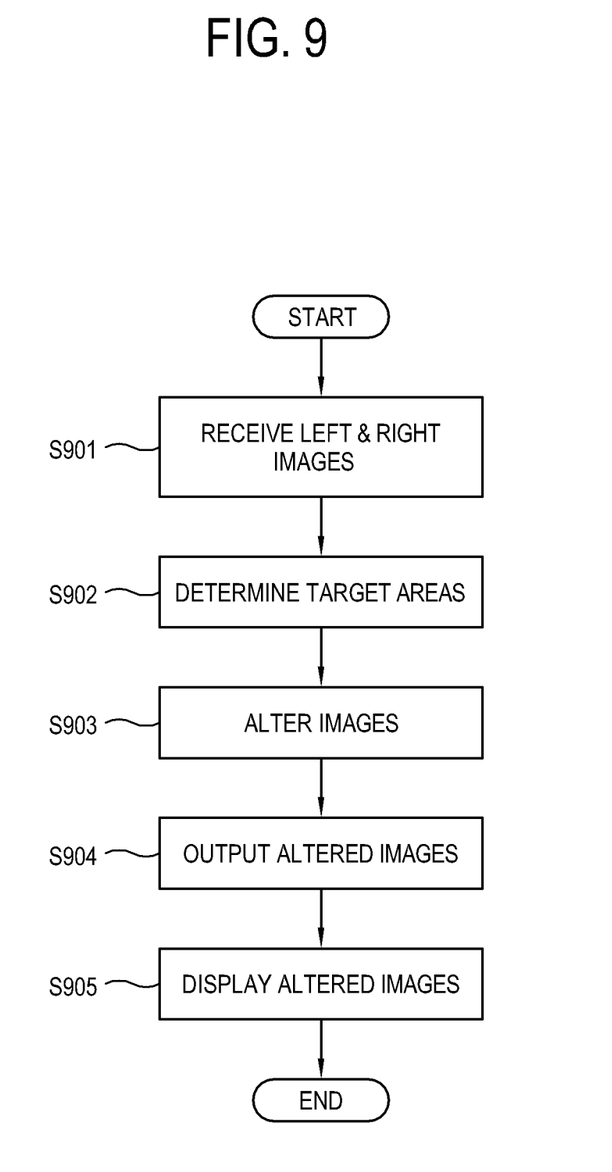
FIG. 9 illustrates an example of an operation according to an exemplary embodiment of the present invention.

Another aspect of the present invention provides a method for altering images. FIG. 9 illustrates an example of an operation according to an exemplary embodiment of the present invention. As shown in FIG. 9, left and right images are received in operation S901. Target areas are then determined within the left and right images in operation S902. The left and right images are then altered in operation S903. The altered images are output in operation S904 and displayed in operation S905.

Another aspect of the present invention provides computer-readable code on a computer-readable recording medium. The computer-readable recording medium is any non-transitory data storage device that can store data which can be thereafter read by a computer system. Examples of a computer-readable recording medium may include read-only memory (ROM), random-access memory (RAM), CD-ROMs, magnetic tapes, floppy disks, optical data storage devices, etc. The computer-readable recording medium can also be distributed over network coupled computer systems so that the computer readable code is stored and executed in a distributed fashion.

The foregoing exemplary embodiments are merely exemplary and should not be construed as limiting the present invention. The present teaching can be readily applied to other types of methods and apparatuses. Also, the description of the exemplary embodiments of the present invention is intended to be illustrative, and not to limit the scope of the claims, and many alternatives, modifications, and variations will be apparent to those skilled in the art.

What is claimed is:

1. An apparatus for altering images, the apparatus comprising:
an input unit operable to receive a left image and a right image; and
an image altering unit which is operable to alter the received left image and the received right image and to output an output image signal including the altered left image and the altered right image, wherein the left image is altered by changing a first portion, which is near a boundary area in the left image, and wherein the right image is altered by changing a second portion, which is near a boundary area in the right image,
wherein at least one of the boundary area in the left image and the boundary area in the right image includes a plurality of sub areas,
wherein each of the plurality of sub areas has at least one of a different color, a different shape, and a different size from other sub areas of the plurality of sub areas, and
wherein the image altering unit alters the first potion and the second portion so as to show predetermined patterns.

2. The apparatus according to claim 1, wherein the boundary area in the left image is near a leftmost boundary of the left image, and wherein the boundary area in the right image is near a rightmost boundary of the right image.

3. The apparatus according to claim 1, wherein the image altering unit changes the first portion by changing a color of the first portion, and wherein the image altering unit changes the second portion by changing a color of the second portion.

4. The apparatus according to claim 3, wherein the changing of the color of the first portion includes changing a color of pixels in the first portion to black, and wherein the changing of the color of the second portion includes changing a color of pixels in the second portion to black.

5. The apparatus according to claim 3, wherein the color of the first portion is substantially a same color as the color of the second portion.

6. The apparatus according to claim 1, wherein the boundary area in the left image is substantially similar in at least one of size and shape to the boundary area in the right image.

7. The apparatus according to claim 1, wherein at least one of the boundary area in the left image and the boundary area in the right image is defined by a user.

8. The apparatus according to claim 1, further comprising an image difference determining unit operable to determine differences between the left image and the right image, wherein the differences are determined based on left image elements, which are present in the left image and absent in the right image, and right image elements, which are present in the right image and absent in the left image, and
wherein, based on the determined differences, the image altering unit changes the first portion and the second portion.

9. The apparatus according to claim 1, further comprising a display operable to display the output image signal output by the altering unit.

10. A method for altering images, the method comprising:
receiving a left image and a right image;
altering the received left image by changing a first portion, which is near a boundary area in the left image;
altering the received right image by changing a second portion, which is near a boundary area in the right image; and
outputting an output image signal including the altered left image and the altered right image,
wherein at least one of the boundary area in the left image and the boundary area in the right image includes a plurality of sub areas,
wherein each of the plurality of sub areas has at least one of a different color, a different shape, and a different size from other sub areas of the plurality of sub areas, and
wherein the altering the received left image alters the first portion and the altering the received right image alters the second portion, so as to show predetermined patterns.

11. The method according to claim 10, wherein the boundary area in the left image is near a leftmost boundary of the left image, and wherein the boundary area in the right image is near a rightmost boundary of the right image.

12. The method according to claim 10, wherein the changing of the first portion includes changing a color of the first portion, and wherein the changing of the second portion includes changing a color of the second portion.

13. The method according to claim 12, wherein the changing of the color of the first portion includes changing a color of pixels in the first portion to black, and wherein the changing of the color of the second portion includes changing a color of pixels in the second portion to black.

14. The method according to claim 12, wherein the color of the first portion is substantially a same color as the color of the second portion.

15. The method according to claim 10, wherein the boundary area in the left image is substantially similar in at least one of shape and size of the boundary area in the right image.

16. The method according to claim 10, wherein at least one of the boundary area in the left image and the boundary area in the right image is defined by a user.

17. The method according to claim 10, further comprising determining differences between the left image and the right image, wherein the differences are determined based on first elements, which are present in the left image and absent in the right image, and second elements, which are present in the right image and absent in the left image, and
wherein the changing of the first portion and the changing of the second portion are performed based on the determined differences.

18. The method according to claim 10, further comprising displaying the output image signal.

\* \* \* \* \*